May 21, 1940.   T. LYDON ET AL   2,201,342
APPARATUS FOR CONTROLLING TEMPERATURES AND HUMIDITY
Filed Dec. 31, 1937   4 Sheets-Sheet 2

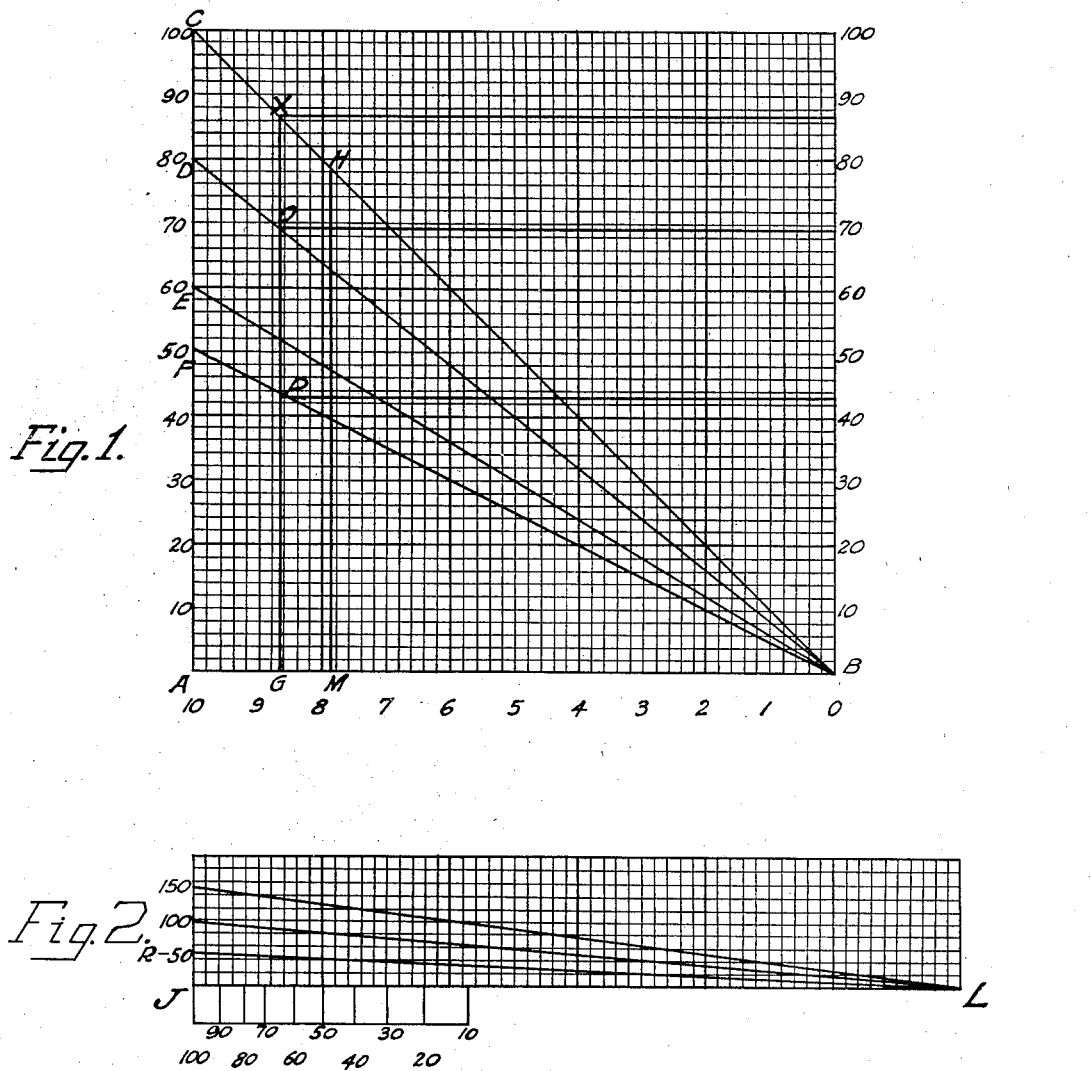

INVENTORS:
Timothy Lydon,
Patrick J. Lydon,
By Harold D. Penney
ATTORNEY

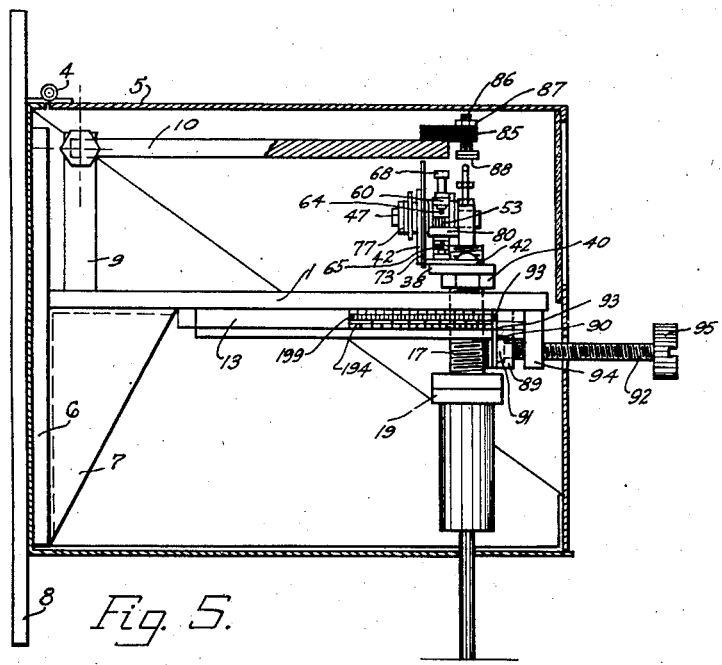
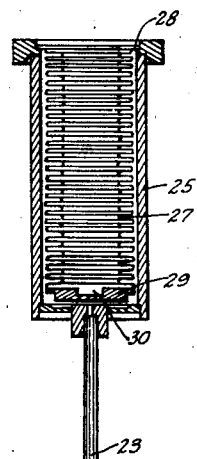
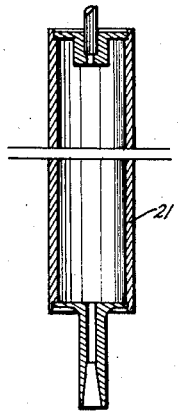
Fig. 5.
Fig. 6.

Patented May 21, 1940

2,201,342

UNITED STATES PATENT OFFICE 2,201,342

APPARATUS FOR CONTROLLING TEMPERATURES AND HUMIDITY

Timothy Lydon, Tenafly, and Patrick J. Lydon, Jersey City, N. J.

Application December 31, 1937, Serial No. 182,818

5 Claims. (Cl. 236—44)

This invention relates to improvements in apparatus for automatically controlling temperatures and humidity, and the operation of air conditioning equipment and other devices such as dryers, humidifying cabinets, etc., where accurate regulation of temperature and humidity is essential to proper results. Humidostats and hygrometers which are actuated by strands of hair, small pieces of wood or skin are generally known to be inaccurate and unreliable. Our invention does not use any of these materials as an actuating medium.

Air conditioning applications may be grouped under two principal heads, i. e., comfort air conditioning and industrial air conditioning. Under both of these heads we find very simple and very elaborate apparatus depending on the size and on the results desired. Generally speaking complete air conditioning systems include elements or means for heating and humidifying the air in the winter and elements for cooling the air in the summer. An object of our invention is to provide a device for automatically controlling such elements at all times so as to provide the desired conditions of temperature and humidity.

It is also an object of our invention to provide this apparatus in a simple form and such that it can be easily adjusted to give the necessary results.

Our invention can be also used for controlling the temperature and humidity in dryers, humidifying rooms and humidifying cabinets, and we regard this as an important application of our invention because a great many materials must be processed under exact conditions of temperature and humidity. At the present time, the apparatus being used for controlling such equipment is very complicated.

Our invention may also be used as a differential temperature control. By this we mean that we can use the control to regulate and control the temperature in a room, cabinet, or duct, in a definite relationship to another temperature which may vary. For instance the control may be used to maintain the temperature of a room at a definite temperature above that of the outside air, or to control the temperature in a duct at a definite point above or a definite point below the temperature of a room.

This invention includes certain features and improvements of the control device shown in our Patent No. 2,105,088, dated Jan. 11, 1938, for Apparatus for humidifying textile yarns; and the present application is a continuation-in-part of said patent.

Thus objects of the present invention are to provide a simple economical temperature and humidity control which will be adaptable to the various phases of air conditioning, process drying and process humidifying. However, this control may be applied to a great variety of control operations too numerous to mention and we therefore do not wish to confine our control to the air conditioning industry but wish to include also such processes as may require the accurate regulation of temperature in relation to the varying conditions of the surrounding atmosphere or of zones or of materials or of liquids.

We may attain these objects by the control equipment and the appurtenances thereof two forms of which are shown in the drawings, or by any mechanical equivalents thereof or obvious modifications of the same.

In the drawings:

Fig. 1 is a diagrammatic chart showing the relationship which exists between the dry bulb temperatures and the wet bulb temperatures for any definite fixed humidity taken over a range of dry bulb temperatures.

Fig. 2 shows the dimensional relationship between the pivoted arm of our control and the scale of percentage humidity which we have derived.

Fig. 5 is a side view of the control.

Fig. 6 is a detailed cross sectional view of the temperature sensitive elements and bellows used to operate our control.

Like characters of reference refer to like parts throughout the different views.

Figures 3, 4:
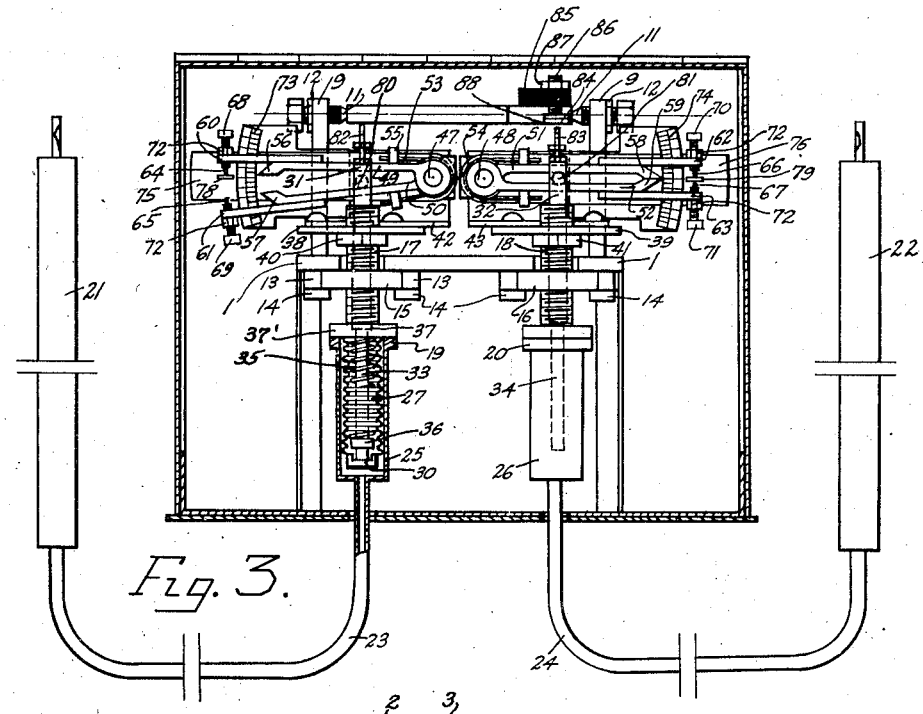
Fig. 3 is a front view of our assembled control, the surrounding case being shown in cross section.
Fig. 4 is a plan view of our assembled control showing the relationship of the pivoted arm to the other parts.

For saturated air the dry and wet bulb temperatures are the same so that for every increment of increase in the dry bulb temperature there is the same increase in the wet bulb temperature. For any definite humidity less than 100 percent there is a practically fixed relationship between the dry bulb temperatures and the corresponding wet bulb temperatures. This relationship may be plotted and shown by means of a chart as indicated in Figure 1.

In Figure 1 the numbers on the left hand vertical line represent dry bulb temperatures. The numbers on the right hand vertical line represent wet bulb temperatures. The horizontal line AB is divided into 10 equal parts. If lines BC, BD, BE, and BF are drawn as shown between the zero point on the horizontal line and the various dry bulb temperatures the following relationship is found to exist with reference to various humidities.

Referring to our psychrometric chart, we find that at 80° F. and a relative humidity of 60% the wet bulb temperature is 69.5° F.

We draw a horizontal line across from the right hand vertical line so that it intersects the line BD. At this intersection we draw a vertical line OG. We call this our 60% relative humidity line and we find that if we plot from our psychrometric chart several wet and dry bulb temperatures corresponding to 60% relative humidity that they all fall in or very close to this vertical line OG. For instance if we refer to our psychrometric chart for the wet bulb temperature corresponding to 100° F. dry bulb and 60% relative humidity it happens to be 87° F. Drawing a horizontal line across from 87° F. wet bulb we find it intersects the line BC at a point $x$ which is also on the line obtained by projecting the line GO. Similarly if we look up the wet bulb temperature corresponding to 50° F. dry bulb and 60% relative humidity we find it to be 43.6° F. and when this wet bulb temperature is projected across to intersect the line BF it does so at a point on the line OG.

We can in a similar manner plot other vertical lines which will represent other humidities such as the line HM which represents 40% relative humidity.

Using geometry and taking the triangles BAF and BGP we have the relationship $$\frac{AF}{GP} = \frac{AB}{GB}$$

Since AF represents dry bulb temperature and GP represents wet bulb temperature we have—

$$\frac{\text{Dry bulb temperature}}{\text{Wet bulb temperature}} = \frac{AB}{GB}$$

In Figure 2 we show how this relationship of the dry bulb temperature to the wet bulb temperature for a fixed relative humidity is utilized in our control. The line JL which is 6″ long represents the pivoted arm of our control. We utilize temperature sensitive elements in our control which expand .005″ per °F. If we set the lowest point of operation for the dry bulb temperature of our control at 50° F. we get an expansion of ¼″. We therefore set our 50° F. point R at ¼″ above the horizontal. The 100° F. point will come ½″ from the horizontal and the 150° F. point T will be ¾″ above the horizontal. With this relationship of measurements and utilizing the principle of the chart shown in Figure 1 we find we can establish a humidity scale as indicated by the numbers 10 to 100 in Fig. 2.

The instrument, as illustrated in the drawings consists essentially of a base plate 1 to which is attached the back plate 2 to which is affixed the case 3. This case is hinged at 4 to the movable part 5 shown in Fig. 5. This case is stiffened by the brackets 6 and the base plate 1 is rigidly supported by the brackets 7. A mounting plate 8 is attached to the case 3 for purposes of mounting the instrument on the wall or post.

The base plate 1 is provided with two posts 9. Between these posts is the pivoted arm 10. This arm is freely pivoted between the pivot points 11. These pivot points are threaded into the posts 9 and secured from loosening by the lock nuts 12.

Attached to the base plate 1, on the bottom, are the slide members 13 and 14. These are shaped to form brackets to support the slidable pieces 15 and 16. The pieces 15 and 16 may be moved in the grooves formed by the members 13 and 14.

The slidable pieces 15 and 16 are provided with threaded holes into which are securely screwed the bearing members 17 and 18. Affixed at the bottom to the bearing members 17 and 18 are the temperature sensitive members 19 and 20. Referring to Figs. 3 and 6 the temperature sensitive members are made up of the bulbs 21 and 22, the capillary tubes 23 and 34 connecting the bulbs to the enclosure tubes 25 and 26. Inside the enclosure tubes 25 and 26 are contained bellows 27. The bellows 27 is attached at 28 to the enclosure 25. The space between the enclosure tubes and the bellows and the space leading down therefrom through the capillary tube to the bulb is filled with a non-compressible but temperature sensitive liquid which for clearness we have not shown.

Attached to the bottom of the bellows is the small circular disc 29 which is provided with a socket 30. Referring to Figure 3 the bearing members 17 and 18 are provided with square and exact longitudinal openings or bores, so that the square shafts 31 and 32 placed inside of them, can move up or down but cannot turn. The lower portions 33 and 34 of the shafts 31 and 32 are circular in cross section so that in each case a compression spring 35 can be placed about them. These compression springs 35 bear against a collar 36 attached at the bottom of the lower portion of the shaft 33, and bear at the other end against the heads 37′ of the tubes 25, 26 which heads engage the shoulder 37 made by the square section of the shaft 31.

The pieces 38 and 39 are threaded and fastened to the bearing members 17 and 18 near the top. Lock nuts 40 and 41 are provided to securely fasten them. To the pieces 38 and 39 are fastened the angle shaped bracket pieces 42 and 43. These pieces are fastened to the pieces 38 and 39 by screws 44 and 45 and with slotted holes 46 to allow for adjustment.

The angle shaped bracket pieces 42 and 43 are provided with horizontal spindles 47 and 48 which form bearings for the jaw pieces 49, 50, and 51, and 52. The jaw pieces are furnished with springs 53 and 54 to keep the jaw pieces in a normally closed position as indicated by the jaws 51 and 52. Small lugs 55 on the jaw pieces are provided with small openings through which the ends of the springs pass.

The jaw pieces are provided with pointed ends 56, 57, 58, and 59 which are used as indicators and also as spacers so that when the jaws come together the arms are parallel with one another.

Attached to the end of each jaw is a small block of insulation as indicated by 60, 61, 62, and 63. These blocks are provided with small contact points 64, 65, 66, and 67 made of platinum iridium or some similar good contact material. The contacts are attached to the ends of brass screws 68, 69, 70, and 71 which are threaded into the insulating blocks and the lock nuts 72 are to hold the screws securely in place.

On the L shaped bracket pieces and behind the jaw pieces are provided the temperature scales 73, and 74. These scales are made of a transparent material which is known as Plexiglass. The scales are placed opposite the pointed ends of the jaws. The horizontal spindles 47, and 48 have projections on the rear of the L shaped bracket pieces 42 and 43 and on these projections are carried the arms 75 and 76. These arms are held in place by the set rings 77 so that they cannot move from their own weight but can be moved by applying a small force to the end of the arm, and so that after they are moved they will maintain themselves in the new position until a similar force is applied.

The arms 75 and 76 are each provided with a small non-resilient rectangular projection arranged at right angles to the plane of the arms, these projections are numbered 78 and 79. They are placed on the arm so that they extend out and come directly between the platinum iridium contact points.

The square shafts 31 and 32 have horizontal pins 80 and 81 which are of circular cross section and which extend out from the shafts and between the jaw pieces 49 and 50 and the jaw pieces 51 and 52. Each of the square shafts 31 and 32 are also provided with slender vertical shafts 82 and 83. The shafts 82 and 83 are made of brass but the shaft 83 is provided with a platinum iridium contact point 84.

The pivoted arm 10 extends from the pivot points 11 to a short distance beyond the vertical shafts 82 and 83. Immediately above the square shaft 32 a rectangular area of the pivoted arm 10 is cut out and an insulating block 85, indicated in Figs. 3 and 5 is attached to the upper surface of the arm 10. Threaded into this block is the brass screw 86 which is firmly secured by a locknut 87. The brass screw has a perfectly flat head to which is attached a perfectly flat surface of contact material such as platinum iridium. this surface is indicated by 88. This platinum iridium surface is placed so that it is exactly in the same plane with the lower surface of the pivoted arm 10 although for applications where the instrument is used as a differential thermostatic control this surface may be set at a definite distance above or below the plane in which lies the lower surface of the pivoted arm 10.

Referring to Figures 4 and 6 it will be seen that the slidable piece 15 is furnished with a lip 89. This lip is provided with a cavity 90 into which is accurately fitted the smooth circular head 91 of the threaded shaft 92. The head 91 is held in the cavity by a cover piece 93 which may be partly seen in Fig. 5. The head 91 is free to turn in the cavity 90 but without the presence of looseness or play. The shaft 92 is threaded through the flange 94 which is provided on the base plate 1. The threaded shaft is provided with a large slotted head 95 which is used to turn the shaft and by this means move the slidable member 15 and the parts attached to it in a direction away from, or towards the flange 94. In a similar manner the slidable member 16 may be moved back or forth for a small distance by means of the threaded shaft 96 furnished with a slotted head 97 and engaging the lip 97A which is attached to the member 16 by the smooth circular head 98 rotating inside the cavity 99. Slots 100 and 101 are provided in the base plate to allow the bearing members 17 and 18 and the other parts attached to them to move with the slidable pieces 15 and 16. Attached to the lip 89 is a pointer 193 which moves with the lip and with reference to either of the two scales 194 and 199 which are attached to the side of the slide member 13. The scale 194 is for humidity and the scale 199 is for differential in temperature.

Figures 7, 8:
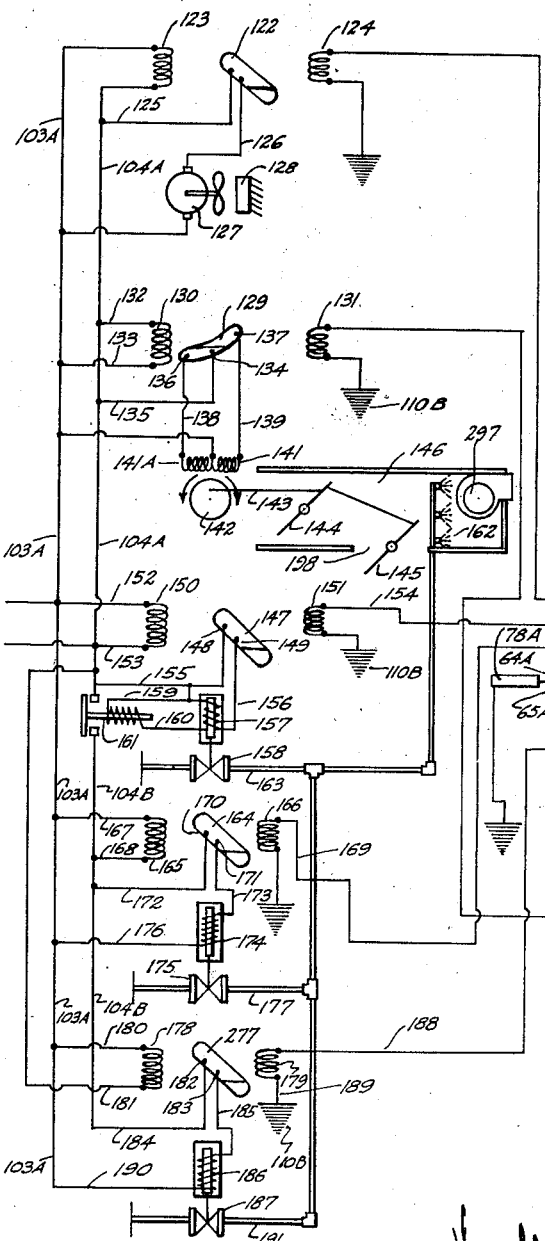
Fig. 7 is a typical wiring diagram of a shaded pole motor such as we utilize with our control.
Fig. 8 is schematic drawing showing the relationship between the various parts of our control and the elements of a typical air conditioning system and showing the interconnecting wiring system.

Referring to Figure 7 we indicate a typical wiring arrangement for use in connection with a shaded pole motor. The power lines 103 and 104 furnish current to the field coil 105 of the shaded pole motor of which 106 represents the magnetic core. The motor is provided with two shading coils 107 and 108 which are connected in series with one another being connected at one end to the contact lever 109 and at the other end to the ground 110. Below the contact lever 109 is indicated a contact post 111 connected to ground 110A. The armature 112 of the shaded pole motor is free to rotate and is provided on its shaft with a gear 113 which engages the geared segment 114 of a pivoted member 115 which is free to pivot about the axis 116. Attached to the member 115 is the mercury switch 117 and connected to the terminals of this switch are two leads 118 and 119. The lead 119 is connected to the coil 120 of the solenoid valve 121 and through this coil to the line 103. The line 118 is connected to the power line 103.

Referring to Figure 8 we indicate the bellows enclosure tube 25A and 26A from which project the shafts 31A and 32A by means of which are actuated the jaw pieces 49A, 50A, 51A, and 52A. At the end of the jaw pieces are indicated the insulating pieces 60A, 61A, 62A, and 63A, to which are attached the contact points 64A, 65A, 66A, and 67A. At the top of the shaft 32A is indicated the contact point 84A immediately above which is located the contact point the screw to which is attached the platinum iridium surface 88A. The screw 86A is attached to the insulating block 85A which is attached to the pivoted arm 10A. Indicated as lying between the contact points 64A and 65A is the projection 78A and between the points 66A and 67A is the projection 79A. Both of these projections are attached to the ground 110B.

The mercury switches 122, 129, 147, 170 and 277 of Fig. 8 are influenced or operated by apparatus similar to that of Fig. 7 in the manner described of such apparatus, the field coils 123, 130, 150, 165 and 178 of Fig. 8 corresponding to the field coil 105 of Fig. 7 and the shading coils 124, 131, 151, 166 and 179 of Fig. 8 corresponding to the shading coils 107, 108 of Fig. 7.

Referring further to Figure 8 we indicate a mercury switch at 122 the position of which is influenced by the field coil 123 and the shading coil 124 of a shaded pole motor. The terminals of the mercury switch are attached by the leads 125 and 126 to the power leads 103A and 104A so that when the mercury switch 122 is closed the motor operated fan 127 blows air through the unit heater 128.

The mercury switch 129 has three terminals through which two different circuits can be made. The position of the bottle is influenced by the current flowing in the field coil 130 and the shading coil 131 of a shaded pole motor. The field coil 130 is connected to the power lines 103A and 104A by the leads 132 and 133. One end of the shading coil is connected to ground 110B and the other end is connected to the contact 67A. The terminal 134 of the mercury switch is connected to the power line 104A by the lead 135. The terminals 136 and 137 of the mercury switch are connected by the leads 138 and 139 to the windings of a damper operating motor, 142 which operates through the linkage 143 the fresh air damper 144 and circulating air damper 145 with respect to the fresh air inlet duct 146.

The mercury switch 147 has two terminals 148 and 149 and is influenced by the current passing through the field coil 150 and the shading coil 151 of a shaded pole motor. The field coil 150 is connected by leads 152 and 153 to the power leads 103A and 104A. The shading coil 151 is connected at one end by the lead 154 to the screw 86A and the contact surface 88A and is connected on the other end to ground 110B. The terminal 148 is connected by the lead 155 to the power line 104A and the terminal 149 is connected by the lead 156 to the coil 157 of the solenoid valve 158. The coil 157 is connected by the leads 159 and 160 with the relay 161 which makes and breaks the circuit in the line 104B. The solenoid valve 158 is the main valve and when open allows water to pass to the spray nozzles 162 through the pipe 163.

The mercury switch 164 is influenced by the current flowing in the field coil 165 and the shading coil 166 of a shaded pole motor. The field coil 160 is connected by leads 167 and 168 to the power leads 103A and 104B as indicated. One end of the shading coil 166 is connected by the lead 169 with the contact point 60A. At the other end it is connected to ground. One terminal 170 of the mercury switch 164 is connected by the lead 172 to the power lead 104B and the other terminal 171 is connected by the lead 173 to the coil 174 of the solenoid valve 175, the coil itself being connected to the power lead 103A by the lead 176. When the solenoid valve is open it allows hot water to pass to the spray nozzles 162 through the pipe 177.

The mercury switch 277 is influenced by the current flowing in the field coil 178 and the shading coil 179 of a shaded pole motor. The field coil is connected by the leads 180 and 181 to the power leads 103A and 104B. The shading coil is connected on one end to the contact point 65A by the lead 188 and on the other end to ground 110B by the lead 189. The terminals 182 and 183 of the mercury switch 277 are connected as indicated by the leads 184 and 185 to the power leads 104B and the coil 186 of the solenoid valve 187, the coil 186 being connected at the other end to the power lead 103A by the lead 190. When the solenoid valve 187 is open it allows cold water to pass to the spray nozzles 162 through the pipe 191.

*Operation*

When our apparatus is used as a humidity control the bulb 21 is used as a wet bulb by being suspended over a small water tank and furnished with a wick which absorbs some of the water so that as air is blown over the bulb and wick, a wet bulb depression occurs at all humidities below 100%. The bulb 22 is used as the dry bulb.

Our instrument is calibrated at 70° F. and is principally for operation at temperatures from 30° F. and upward to 120° F. although it can be used equally well over other ranges by using different bulbs. The calibrating temperature of 70° F. is suitable however for general air conditioning work. We therefore set our scale and arrange the various adjustments of our instrument so that when the temperature of each bulb is 70° F. the two pointers 56 and 57 point to the center mark of the scale 73 and the two pointers 58 and 59 are opposite the center of the scale 74. In these positions the jaw pieces 49 and 50 and 51 and 52 are together and are all horizontal.

If the temperature of the bulb 21 is decreased the pressure of the liquid inside is decreased and the socket 30 at the bottom of the bellows recedes downward slightly, allowing the shaft 33 to recede downward slightly, under the pressure of the compression spring 35. As the lower portion 33 of the shaft recedes downward so does the upper square portion 31 and the horizontal pin 80. As the post 80 moves downward it forces the jaw piece 50 to pivot and open away from the jaw piece 49 against the pressure of the spring 53. As the jaw 50 opens away from the jaw 49 an air gap is created between the contact point 65 and the projection 78 which is attached to the arm 75 which remains fixed until moved by the hand.

Similarly if the temperature of the bulb 21 is increased the jaw piece 49 pivots upward opening an air gap between the contact point 64 and the projection 78.

In a similar manner when the bulb 22 is cooled the jaw 52 opens downward creating an air gap between the contact point 67 and the projection 79 and when the temperature of the bulb increases an air gap is made between the contact point 66 and the projection 79.

The temperature at which separation of the contact point 64 from the projection 78 occurs may be selected readily on the temperature scale 73 and definitely fixed by moving the arm 75 and the projection with it so that the projection 78 is opposite the temperature selected on the scale. Similarly the temperature at which the contact point 66 separates from the projection 79 may be selected and set by moving the arm 76 and with it the projection 79 until this projection is opposite the desired temperature as marked on the temperature scale 74.

Under operating conditions we utilize the separation of the contact 64 from the projection 78 to shut off the heating medium and we utilize the separation of the bottom contact point 65 from the projection 78 to turn on the heating medium. In this manner we have upper and lower limits with reference to the point of control. The number of degrees between the temperature at which the heat is knocked off and the temperature at which it is knocked on is known as the differential and may be definitely set by adjusting the distance between the two contact points 64 and 65 when the jaws are closed. In a similar manner we have upper and lower temperature limits for the controlling mechanism in connection with the bulb 22. In this case also the differential may be set by adjusting the distance between the contact points 66 and 67 when the jaws are closed. In operation as a humidity control the bulb 21 is used as a wet bulb and the bulb 22 is used as the dry bulb.

In calibrating our instrument both bulbs are placed in water so as to be at the same temperature of 70° F. and at the same time both the vertical shafts 82 and 83 and the assemblies to which they are attached are brought in line so as to be exactly equidistant from the center line XY of the pivot points 11. At the same time the vertical distance of these points above the top surface of the base plate 1 is made exactly ¼" more than the vertical height of the center line of the pivot points 11 above the base plate 1. This gives a slope of ¼" in 6" to the pivoted arm 10, with respect to the base plate 1, and in this position the top of the shaft 82 just touches the bottom of the pivoted arm 10 while the top of the shaft 83 just touches the platinum iridium surface 88 which is adjusted to be exactly in the same plane as the bottom surface of the pivoted arm 10. We select 70° F. as our calibrating point because this temperature appears to be a comfortable room temperature and is the temperature usually required around factories, homes, etc. If this control were to be used at lower temperatures it would be calibrated in a similar manner but at a lower temperature. If the control is to be used at relatively high temperatures it would accordingly be calibrated to suit the scale of operation. In the instance under consideration the lowest temperature represented on the scale is 20° F. and the highest is 120° F. This gives us a temperature range of from 20° F. to 120° F.

In operation as a humidity control the vertical shaft 83 and the parts attached to it remain stationary with respect to the horizontal distance away from the center line XY of the pivot points 11. The vertical shaft 82 together with its attachments 31, 33, bearing member 17, slidable piece 15 and enclosure tube 25 may be all moved inward towards the center line XY of the pivots 11, by turning the slotted head 95. In future we will refer to this assembly as the Q assembly for brevity. To set the instrument to a selected percentage of humidity we turn the slotted head 95 until the pointer (193 Fig. 5) attached to the slidable piece 15 corresponds with this particular humidity as marked on the humidity scale 194.

In addition to selecting the humidity on the humidity scale and moving the Q assembly accordingly, we set the dry bulb temperature we require on the right hand scale 74 by moving the arm 76 and setting the projection 79 opposite the desired temperature. Then referring to our psychrometric chart we determine the wet bulb temperature corresponding to the humidity selected and we set this temperature on the left hand scale 73. Under ordinary circumstances we allow a small space to exist between the contact points 64, and 65, and 66 and 67, this space being such that the differential temperature is about 1° F. The projections 78 and 79 although indicated to have thickness are in actual practice very thin pieces of platinum iridium fastened to the end of substantially stiff pieces of brass.

Each of the brass screws 68, 69, 70, and 71 are connected to separate small flexible wires which for clearness are not shown and which are insulated except at the point of connection and these wires are threaded through small openings in the lugs 55. Each of these wires are connected to separate insulated terminals (not indicated) in the instrument case. To these terminals are made the required connections when placing the control instrument in operation.

The operation of the control in conjunction with the various parts of an air conditioning system will be understood from a study of Figure 8 but before outlining this, Figure 7 is introduced to explain the operation of the type of shaded pole motor relay which we employ in Figure 8.

Referring to Figure 7 the alternating current power line 103 and 104 supply energy to the field coil 105 which sets up an alternating magnetic field in the magnetic core 106. By closing the electrical circuit containing the shading coils 107 and 108 by allowing the contact lever 109 to touch the contact 111, the current induced in the shading coils by the alternating magnetic field of the magnetic core, is permitted to flow through the circuit containing these shading coils. Passage of this current unbalances the armature 112 and causes it to rotate in a clockwise direction so that the gear or pinion 113 turns with it and causes to turn in a counterclockwise direction the geared segment 114, about the axis 116. In turning about the axis in this manner the geared segment 114 carries with it the mercury switch 117 tipping it into the closed position so that current passes through the line 119, through the coil 120 and opens the solenoid valve 121.

Referring to Figure 8 it can be seen that we have shown our control diagrammatically, as well as the several operating elements which would make up a complete air conditioning system. We have indicated our method of controlling the operation of these elements by means of several shaded pole motor relays operating in conjunction with our control. These relays in actual practice would be grouped together inside a single electrical control panel.

Assuming that we have set our control for dry bulb temperature, wet bulb temperature and have also set our relative humidity with respect to the humidity scale 194 and that we have made the electrical connections as indicated in Figure 8. The action of the control would be as follows, over a winter summer period.

In the winter under normal circumstances it would be necessary to supply both heat and humidity to a home or factory building. As the temperature normally would be too low the contact 62A would touch the projection 79A allowing current to flow through the shading coil 124 and tipping the mercury switch into the closed position so that the motor 127 runs and blows air through the unit heater 128 to heat the room up. Under normal winter conditions the wet bulb temperature and humidity would be low and this being the case the contact 64A would touch the projection 78A allowing current to flow through the shading coil 166 which causes the mercury switch 164 to tip and allow current to flow in the coil 174 of the hot water solenoid valve 175 opening the valve and allowing hot water to be sprayed through the nozzles 162 by means of which the air circulated in the room is humidified. It will be noticed however that before we can get current in line 104B so as to energize the coil 165 that the relay 161 must be in the closed position. Because at the outset the humidity was below the desired amount the shaft 31A will be in a retracted position and will allow the contact surface 88A to touch the contact 84A allowing current to flow in the shaded coil 151 and tipping the mercury switch 147 opening the main solenoid valve 158 and closing the normally open relay 161. The opening of the valve 158 allows water to be sprayed from the spray nozzles 162 and this water is mixed with hot water from the valve 175.

In due time the temperature of the room will reach the desired point and the contact 66A will be lifted away from the projection 79A and in due time also the wet bulb temperature and the humidity will reach the desired point in which case the shaft 31A will lift the pivoted arm 10A and cause the separation of the contact surface 88A from the contact 84A and separation also of the contact 64A from the projection 78A. The spacing of the contacts 64A and 65A is arranged so that separation of contacts 88A and 84A takes place first so that the hot water valve 175 is opened at such times as the humidity and wet bulb temperature fall excessively. Under normal conditions cooling or dehumidification should not be required during the winter season so to explain how our control functions with respect to cooling and dehumidification we will next consider summer conditions.

Under normal summer conditions the prevailing temperature and humidity would be too high particularly in a factory where considerable heat may be given off by electric motors and moving parts. When the temperature exceeds the desired amount the shaft 32A will be elevated and will allow the contact point 67A to touch the projection 79A allowing current to flow in the shading coil 131 and causing the mercury switch 129 to tilt in a position so that current flows from the power lines 103A and 104A to the terminals 134 and 137 through the damper operating coil 141A which causes the fresh air damper 144 to open and the recirculating damper 145 to close by means of the linkage 143. When the damper 144 is open fresh air is drawn into the room through the duct 146 by the fan 297.

The wet bulb temperature being also excessive during normal summer conditions the shaft 31A will be elevated and will allow the contact 65A to touch the projection 78A allowing current to pass through the shading coil 179 tipping the mercury switch 277 thus allowing current to flow in the coil 186 of the solenoid valve thus opening this valve and allowing cold water to be sprayed by the spray nozzles 162 into the air being discharged into the room from the duct 146. The water passing through the valve 187 may be cold well water or water chilled by refrigerative means. As the wet bulb temperature declines due to the dehumidification brought about by the cold water sprays, the shaft 31A recedes downward creating an air gap between the contact 65A and the projection 78A thus knocking off the circulation of cold water to the spray nozzles.

When in summer the temperature reaches the desired point the shaft 32A recedes and creates an air gap between the contact 67A and the projection 79A thus breaking the current in the shading coil 131 and allowing the mercury switch 129 to resume its normal position such that current can flow between the terminals 134 and 137 and in the coil 141 of the damper operating motor 142 which through the linkage 143 causes the damper 144 to close and the damper 145 to open so that the air in the room is now recirculated through the recirculation intake 198 in the duct 146. As some heat is being generated in the room and given off into the air, the natural tendency will now be for the dry bulb temperature to again begin increasing.

Until such time as the wet bulb temperature in the room reaches the desired point cold water will continue to circulate through the sprays 162, and to decrease both the wet and dry bulb temperatures. If the dry bulb temperature in the room is excessively diminished before the wet bulb temperature is reached some heat may be turned on as in the winter, but the heat generated in the room would ordinarily make this unnecessary as condensation of moisture from the air by the cold sprays and expansion of the air due to recirculation and the heat generated in the room by machinery or heat given off from other sources would cause a rapid decrease in the humidity or in the wet bulb temperature.

In addition to being used as a humidity control this device can also be used as a differential control in either of two ways. The first method of applying this device as a differential control is as follows: Set the vertical shafts 82 and 83 and the parts attached to them at equal distances from the axis XY of the pivot points 11. Now set the vertical height of these shafts so that they are both the same so that the shaft 82 will touch the bottom surface of the pivoted arm 10 and the shaft 83 will touch the bottom platinum iridium surface 84 of the screw 86. Suppose then we want to control the temperature in a duct so that it is always 5° below the outside room air. We put the bulb 21 in the air of the room and put the bulb 22 in the duct. We then lower the surface 84 by turning down the screw 86 a small amount corresponding to the five degrees difference we wish to maintain. In using our control in this manner we control the temperature by means of the making and breaking of the circuit between the top of the shaft 83 and the surface 84 and do not utilize the other control contacts at all. The five degrees difference will be maintained by the making and breaking of the circuit between the contacts 83 and 84 and the bulb 21 being placed in the room will cause the pivoted arm 10 to move up or down with the room temperature thus causing the control point to change as the room temperature changes.

The second method of using the control as a differential control is preferable to the first because by the second method a more delicate setting can be made. This method is as follows: Set the vertical shafts 82 and 83 and the parts attached to them at equal distances from the axis XY of the pivot points 11. Set the vertical height of these shafts so that they are both the same and so that the shaft 82 touches the bottom surface of the pivoted arm 10 and the shaft 83 touches the bottom platinum iridium surface 84 of the screw 86, the surface 84 and the bottom surface of the pivoted arm 10 being in the same plane.

Now to set a differential temperature between the bulb 21 and the bulb 22 we merely turn the knob 95 so that we move the whole assembly Q so that the pointer 193 is opposite the differential temperature marked on the differential scale 199. As explained previously the pivoted arm 10 is inclined slightly to the base plate 1, so that as we move the assembly Q towards the axis XY the shaft 82 raises the pivoted arm 10 slightly opening up a gap between the shaft 83 and the surface 84, the amount of this gap depending on the amount we move the assembly Q, towards the axis XY. As the pivoted arm 10 is inclined at only a slight angle it is possible to move the assembly Q so as to leave a very small space between the shaft 83 and the surface 84 and thus set a very small differential temperature, the differential temperature corresponding to certain amounts of movement being marked on the differential scale 199 on the side.

We claim as our invention:

1. In combination, a fixed pivot means; an arm pivoted to said pivot means; supporting pieces at least one of which is adjustable toward the pivot means; members movably mounted on the respective pieces one of the members being electrically conductive; an electric contact insulated on said arm; heat sensitive devices for moving said members on the same temperature change in a direction to engage the arm and contact respectively to move the arm in the same direction; and temperature control means including electric operating means controlled by engagement of said contact.

2. In combination, a support; a fixed pivot means on the support; an arm pivoted at one end to said pivot means for movement toward or from the support; members slidably mounted on the support for movement toward or from the arm; an electrical contact insulated on said arm adjacent to one member; and heat sensitive means including means for moving said members toward or from the arm and into contact with the arm and contact respectively; the part of the member engageable with the contact plate being electrically conductive.

3. In combination, a support; a fixed pivot means on the support; an arm pivoted at one end to said pivot means for movement toward or from the support; a pair of supporting pieces on said support near the free end portion of the arm and mounted for adjustment toward or from said pivot means; members slidably mounted on the respective pieces for movement toward or from the arm; heat sensitive means including means for moving said members toward or from the arm and tending to move the arm in the same direction on the same temperature change; an electrical contact insulated on said arm adjacent to one member; said members being adapted to engage the arm and contact respectively, the part of the member engageable with the contact plate being electrically conductive; and a temperature control means controlled by engagement and disengagement of said contact.

4. In combination, a support; a wide flat arm pivoted on said support in a plane radial to the pivotal axis; supporting pieces adjustably slidably supported on said support adjacent to the free end portion of the arm, for movement substantially toward and from said axis in spaced planes perpendicular to said axis; shafts slidably mounted on the respective pieces approximately perpendicular to the arm; a pair of non-yielding heat-sensitive means for forcing the respective shafts toward the arm; an insulated electrically conducting contact plate in and flush with the face of said arm adjacent to one of said shafts; the ends of said shafts being adapted to engage the adjacent faces of said arm and contact plate respectively, the end at the contact plate being electrically conductive; a temperature control means including a motor having a shading coil; and conducting means for connecting said coil in series with said contact plate and conductive end.

5. In combination, a supporting plate; a pair of posts spaced apart and mounted on said supporting plate and having pivot points respectively on said posts alined on an axis parallel to the plate; a wide flat arm pivoted at one end between said points in a plane radial to said axis and in spaced relation with the plate; spaced supporting pieces adjustably slidably supported on said plate near the free end portion of the arm, for movement toward or from said axis in planes perpendicular to said axis; shafts transverse to the plate slidably mounted on the respective pieces; a pair of thermometers having incompressible heat sensitive medium therein; means for directing the force of said medium of the thermometers against the respective shafts to move them toward the arm; an electrically conducting contact plate in and flush with the face of said arm adjacent to one of said shafts; ends of said shafts being adapted to engage the adjacent faces of said arm and contact plate respectively, said upper part at the contact plate being electrically conductive; a temperature control means; an alternating current motor for controlling said control means provided with a shading coil; and conducting means for connecting said coil in series with said conducting plate and conducting end.

TIMOTHY LYDON.
PATRICK J. LYDON.